A. H. PEYCKE.
BRAKE SUPPORTING AND LEVELING DEVICE.
APPLICATION FILED JULY 29, 1918.
1,335,187.
Patented Mar. 30, 1920.
2 SHEETS—SHEET 1.
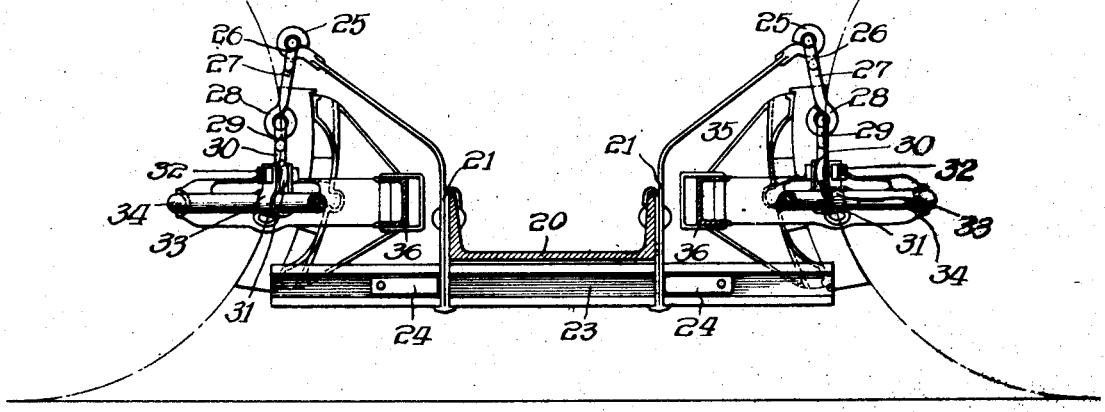
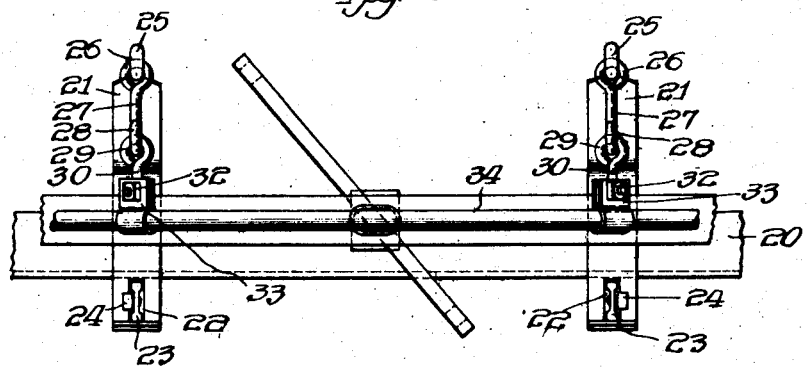
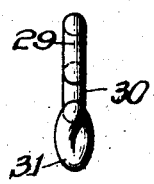 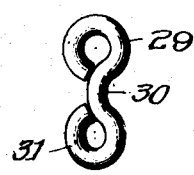
Witnesses
R. Burkhardt
Chas. L. Byron
Inventor
Armand H. Peycke
By Wilkinson & Huxley
Attys.

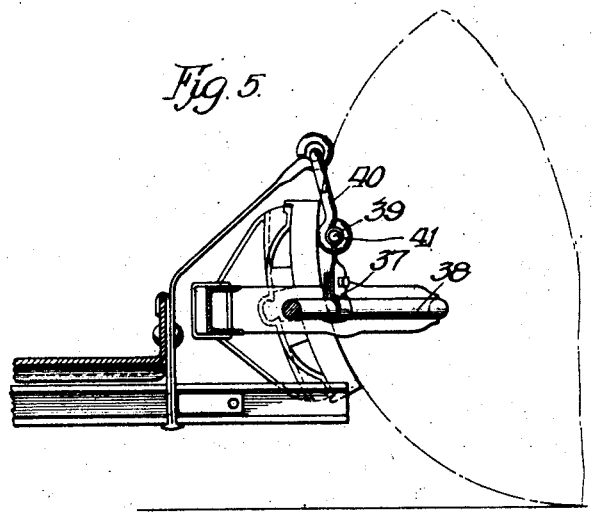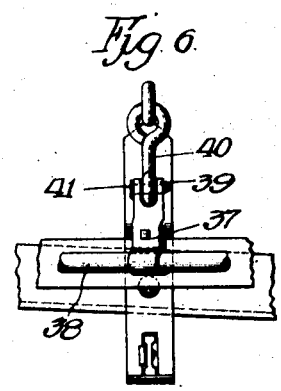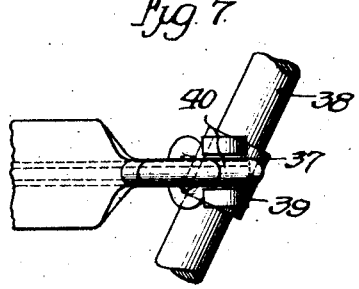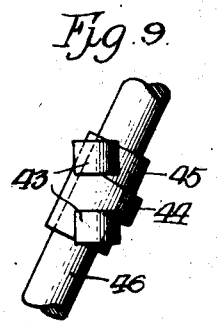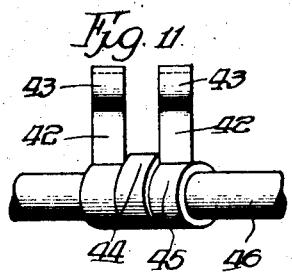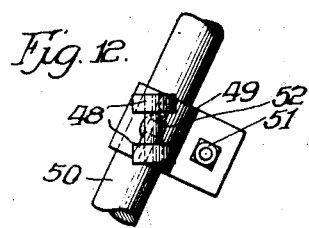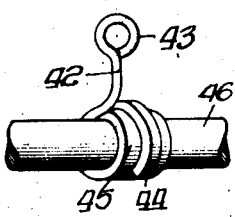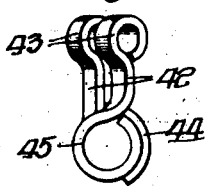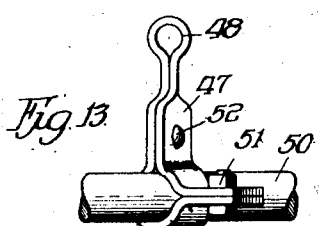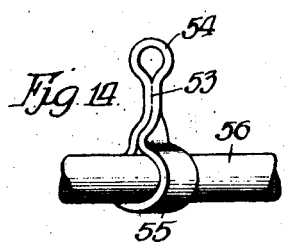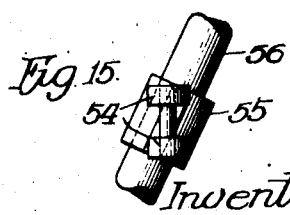

UNITED STATES PATENT OFFICE.

ARMAND H. PEYCKE, OF CHICAGO, ILLINOIS, ASSIGNOR TO AMERICAN STEEL FOUNDRIES, OF CHICAGO, ILLINOIS, A CORPORATION OF NEW JERSEY.

BRAKE SUPPORTING AND LEVELING DEVICE.

1,335,187.  Specification of Letters Patent.  Patented Mar. 30, 1920.

Application filed July 29, 1918. Serial No. 247,099.

*To all whom it may concern:*

Be it known that I, ARMAND H. PEYCKE, a citizen of the United States, residing at Chicago, in the county of Cook and State of Illinois, have invented certain new and useful Improvements in Brake Supporting and Leveling Devices, of which the following is a specification.

This invention relates to brake supporting and leveling devices and more particularly to a fourth point supporting and leveling arrangement.

The object of the invention is to improve a device of this nature, whereby the parts thereof may coöperate in an improved manner to meet the requirements for successful commercial operation.

This and other objects are accomplished by means of the arrangements shown by the accompanying sheets of drawings, in which—

Figure 1 is a fragmentary side elevation, parts being in section, of a railway car truck embodying my invention, Fig. 2 is a fragmentary end elevation of the brake supporting and leveling device shown in Fig. 1, Figs. 3 and 4 are front and side views of a link forming a part of the supporting and leveling connection for the brake, Fig. 5 is a fragmentary side elevation of a railway car truck embodying a modification of my invention, Fig. 6 is a detail front elevation of the supporting and leveling arrangement shown in Fig. 5, Fig. 7 is a fragmentary plan view of the arrangement shown in Fig. 5, Fig. 8 is a perspective view of a modified form of clevis, which is adapted to be secured to tension member of the brake beam, Fig. 9 is a plan view, Fig. 10 a side elevation, Fig. 11 a rear elevation of the clevis shown in Fig. 8 applied to the tension rod of a brake beam, Fig. 12 is a plan view, and Fig. 13 side elevation of another modified form of clevis secured to the tension member of a brake beam, and Fig. 14 is a side elevation, and Fig. 15 a plan view of another modified form of clevis secured to the tension member of a brake beam.

The various novel features of my invention will be apparent from the following description and drawings, and will be particularly pointed out in the appended claim.

Referring first to Figs. 1 to 4, inclusive, disclosing the preferred form of my invention, it will be seen that the invention is applied to a railway car truck including a spring plank 20, secured to opposite sides of which at each end of the spring plank is a combined safety bar bracket and brake beam leveling device 21, said member in each instance preferably being hooked over a vertical flange of the spring plank and having at its lower portion a perforation 22 for the reception of the brake beam safety bar 23, there being one at each side of the truck, as shown in Fig. 2. The safety bars normally are held in position with respect to their supporting bracket by spring clips 24. These safety bars underlie the brake beams and perform the function of preventing the brake beams from falling to the track in the event that they become detached from their normal hangings. The upper part of the member 21, which preferably is resilient, terminates in a hook 25 which receives the upper eye portion 26 of a link 27 having a lower eye portion 28 at right angles to the upper eye portion 26. This lower eye portion 28 is connected to the eye portion 29 of another link 30 having a lower eye portion 31 turned at a slight angle with respect to the upper eye 30. This lower eye portion 31 of the link 30 receives a bolt 32, which also passes through the two upwardly extending legs of a clevis 33, the lower portion of the clevis embracing the tension member 34 of a brake beam 35 of the truss type, and including a compression member 36. This arrangement is the same on both sides of the truck, whereby a fourth point support for the brake beam is formed, it being understood that the regular brake hangers are provided for the brake heads.

It will be noted that no pins or cotter keys are necessary with this arrangement, and in view of the fact that the lower eye portion 31 of the link 30 is in alinement with the tension rod 34, there is perfect freedom of movement permitted the brake beam during braking and releasing operations. At the same time the brake beam is supported in a manner to meet all requirements for successful commercial operation.

The modification shown in Figs. 5, 6 and 7 differs from the arrangement shown in Figs. 1 to 4, inclusive, by omitting the link 30 and substituting therefor a clevis 37, which is secured to the tension member 38 of the brake beam, and has an upper bifurcated portion for the reception of the eye portion 39 of the link 40, the legs of the bifurcated portion being formed in eyes for the reception of a pin 41 which also extends through the eye portion 39 of the link 40.

The clevis shown in Figs. 8 to 11, inclusive, includes two upwardly extending leg members 42 having at their upper ends eyes 43 for the reception of a pin which is also passed through the lower eye portion of a link to be placed between said eye portions 43. The material between the legs 42 is cut into a strip 44 which is wrapped around a collar portion 45 of the clevis, which embraces the tension member 46 of the brake beam. This collar or band portion 45 is applied to the tension member after being heated, whereby when said band shrinks it firmly grips the tension rod.

In the modification shown in Figs. 12 and 13, the clevis 47 has the upper portion of its legs formed in an eye 48, its lower portion 49 embracing tension rod 50 and clamped thereto by a bolt and nut arrangement 51, the intermediate portion being riveted, as shown at 52.

In the modification shown in Figs. 14 and 15, the intermediate portion 53 of the clevis has its parts welded together, the upper eye portions 54 of the spaced legs being arranged for the reception of a pin, and the lower band portion 55 of the clevis embracing a brake beam tension member 56.

There may be other modifications of this brake supporting and leveling device, and other modifications of the parts thereof, and it is my intention to cover all such modifications falling within the spirit and scope of the following claim.

What I claim is:

In brake mechanism, the combination of a brake beam having a tension and a compression member, a supporting member overlying said brake beam, a link connected to said supporting member, a second link connected to the first link and having an eye portion extending at the same angle as the tension member, and a clevis connected to said tension member and operatively connected to the associated eye portion of said second link.

Signed at Chicago, Illinois, this 19th day of July, 1918.

ARMAND H. PEYCKE.